US008555125B2

(12) United States Patent
Sahara

(10) Patent No.: US 8,555,125 B2
(45) Date of Patent: Oct. 8, 2013

(54) TRANSMITTING APPARATUS AND WIRELESS COMMUNICATION METHOD

(75) Inventor: Toru Sahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1166 days.

(21) Appl. No.: 12/474,200

(22) Filed: May 28, 2009

(65) Prior Publication Data

US 2009/0300453 A1  Dec. 3, 2009

(30) Foreign Application Priority Data

May 28, 2008  (JP) ................................ P2008-138878

(51) Int. Cl.
G08C 25/02 (2006.01)
(52) U.S. Cl.
USPC .......................................................... 714/748
(58) Field of Classification Search
USPC .......................................................... 714/748
See application file for complete search history.

(56) References Cited

U.S. PATENT DOCUMENTS

| 2003/0131299 | A1* | 7/2003 | Ahn et al. ....................... 714/748 |
| 2004/0081248 | A1* | 4/2004 | Parolari .......................... 375/259 |
| 2004/0196801 | A1 | 10/2004 | Hiramatsu |
| 2004/0266451 | A1* | 12/2004 | Stolyar et al. .............. 455/452.2 |
| 2008/0198814 | A1* | 8/2008 | Wengerter et al. ............ 370/336 |
| 2010/0128622 | A1* | 5/2010 | Horiuchi et al. .............. 370/252 |
| 2011/0044379 | A1* | 2/2011 | Lilleberg et al. .............. 375/211 |

FOREIGN PATENT DOCUMENTS

| JP | 7-336366 | 12/1995 |
| JP | 2003-198556 | 7/2003 |
| JP | 2003-283471 | 10/2003 |
| JP | 2006-502659 | 1/2006 |
| JP | 2006-505219 | 2/2006 |

OTHER PUBLICATIONS

Office Action from Japanese Patent Application No. 2008-138878, mailed on Jul. 20, 2010, 5 pages.

* cited by examiner

*Primary Examiner* — Albert Decady
*Assistant Examiner* — Enam Ahmed
(74) *Attorney, Agent, or Firm* — Duane Morris LLP

(57) ABSTRACT

A transmitting apparatus and a wireless communication method are provided. The transmitting apparatus is capable of transmitting, together with transmission data, retransmission data in response to an HARQ from a receiving apparatus, according to an MCS determined based on a request from the receiving apparatus and includes a storage portion which stores information indicating a transition of an FER with respect to a communication quality for each MCS in both cases in which an HARQ response is enabled and disabled, an HARQ switching portion which switches whether to enable or disable the HARQ response in accordance with a QoS class of data to be transmitted, and an MCS switching portion which switches an MCS in accordance with the switching of whether to enable or disable the HARQ response, while referring to the information stored in the storage portion.

7 Claims, 9 Drawing Sheets

FIG. 4

| MCS IDENTIFIER | MODULATION SYSTEM | CODING SYSTEM (PUNCTURING RATE) | MODULATION EFFICIENCY |
|---|---|---|---|
| 0 | BPSK | 1 | 0.5 |
| 1 | BPSK | 3/4 | 0.67 |
| 2 | QPSK | 1 | 1 |
| 3 | QPSK | 4/6 | 1.5 |
| 4 | Reserved | — | — |
| 5 | 16QAM | 1 | 2 |
| 6 | 16QAM | 4/6 | 3 |
| 7 | 64QAM | 3/4 | 4 |
| 8 | 64QAM | 6/10 | 5 |
| 9 | 256QAM | 4/6 | 6 |
| 10 | 256QAM | 8/14 | 7 |

TRANSMITTING APPARATUS AND WIRELESS COMMUNICATION METHOD

CROSS-REFERENCE TO RELATED APPLICATION

This application claims priority from Japanese Patent Application No. 2008-138878, filed on May 28, 2008, the entire subject matter of which is incorporated herein by reference.

BACKGROUND OF THE INVENTION

1. Field of the Invention

The present invention relates to a transmitting apparatus and wireless communication method which can perform wireless communication by adaptive modulation (high-speed adaptive modulation).

2. Description of the Related Art

Recently, mobile stations such as a Personal Handy phone System (PHS), a portable telephone, and the like are widely used, and a telephone call or access to information becomes enabled irrespective of time and place. Nowadays, particularly, the amount of available information is ever increasing. In order to download large amount of data, a high-speed and high-quality wireless communication system has been employed.

As a standard for next-generation PHS communication capable of performing high-speed digital communication, for example, an Association of Radio Industries and Businesses (ARIB) STD T95 and PHS Memorandum of Understanding (MoU) are known. In such communication, an Orthogonal Frequency Division Multiplexing (OFDM) system is employed. The OFDM system is classified as one category of the multiplexing system and uses a plurality of carrier waves on a unit time axis, and frequency bands of the carrier waves are partly overlapped with one another so that, in adjacent carrier waves, the phases of signal waves to be modulated are orthogonal to each other, whereby the frequency band is effectively used.

In OFDM system, sub-channels are allocated to users by time sharing manner. Further, an Orthogonal Frequency Division Multiplexing Access (OFDMA) system is also provided in which a plurality of users share all sub-channels, and a sub-channel which is highest in transmission efficiency for each user is allocated to the user.

In ARIB STD T95 and PHS MoU, a receiving apparatus transmits a modulation and coding scheme (hereinafter, abbreviated as MCS) which is determined by adaptive modulation, to a transmitting apparatus through an anchor channel in a Fast access channel based on Map-Mode (FM-mode) (for example, see ARIB STD-T95), and the transmitting apparatus modulates data based on the MCS. Therefore, the transmitting apparatus and the receiving apparatus can perform communication using the MCS which is optimum in the communication environment at the timing.

In such adaptive modulation, based on the Signal to Interference and Noise Ratio (SINR) or bit error rate of a communication signal, the communication environment between the transmitting apparatus and the receiving apparatus is estimated, an MCS which exhibits a higher modulation efficiency is selected under a better communication environment, and that which exhibits a lower modulation efficiency is selected in a worse communication environment. Accordingly, stable wireless communication can be performed.

In ARIB STD T95 and PHS MoU, when a receiving apparatus receives erroneous data, the receiving apparatus transmits an Automatic Repeat reQuest (hereinafter, abbreviated as ARQ) which requests the transmitting apparatus which has performed the data transmission, to retransmit the data. In response to the ARQ, the transmitting apparatus performs the retransmission of the data by using a MAC layer (lower layer). Accordingly, the error can be efficiently compensated within a short control time (see A-GN4.00-01-TS Rev. 3 "Next Generation PHS Specifications", Page 331-340).

Further, in ARIB STD T95 and PHS MoU, a Hybrid ARQ (HARQ) technique is employed in which the ARQ is combined with the forward error correction (FEC) to further improve the efficiency of packet error correction (for example, see JP-A-2006-502659 or WO2004/034656). Also a technique is known in which HARQ buffers are collectively erased in response to an affirmative response in such as HARQ (for example, see JP-A-2006-505219 or WO2004/042954).

In ARIB STD T95 and PHS MoU, when transmission data of the Quality of Service (QoS) class which does not accept delay, such as voice data which requires a real time property occur, a transmitting apparatus forcibly cancels (disable) transmission of retransmission data in response to an HARQ, and preferentially transmits the transmission data which does not accept delay. Therefore, the gain by the HARQ retransmission which expected to be obtained cannot be achieved. Despite this, assuming that the HARQ is enabled, the transmission data are transmitted while maintaining the MCS which is determined based on a request from the receiving apparatus, and which exhibits a high modulation efficiency. Therefore, an error may occur.

SUMMARY OF THE INVENTION

The present invention has been made in view of the above circumstances. Accordingly, an aspect of the present invention is to provide a transmitting apparatus and wireless communication method which perform wireless communication by an adequate MCS in accordance with whether an HARQ is enabled or disabled, so that highly stable wireless communication can be obtained.

According to an exemplary embodiment of the present invention, there is provided a transmitting apparatus capable of transmitting, together with transmission data, retransmission data in response to a Hybrid Automatic Repeat Request (HARQ) from a receiving apparatus, according to a Modulation and Coding Scheme (MCS) determined based on a request from the receiving apparatus, the transmitting apparatus comprising: a storage portion which stores information indicating a transition of a Frame Error Rate (FER) with respect to a communication quality for each MCS in a case in which an HARQ response is enabled and in a case in which an HARQ response is disabled; an HARQ switching portion which switches whether to enable or disable the HARQ response in accordance with a Quality of Service (QoS) class of data to be transmitted; and an MCS switching portion which switches between an MCS in a case of the HARQ response being enabled and a corresponding MCS in a case of the HARQ response being disabled in accordance with the switching of whether to enable or disable the HARQ response, while referring to the information stored in the storage portion.

According to another exemplary embodiment of the present invention, there is provided a wireless communication method for transmitting, together with transmission data, retransmission data in response to a Hybrid Automatic Repeat Request (HARQ) from a receiving apparatus, according to a Modulation and Coding Scheme (MCS) determined based on a request from the receiving apparatus, the method comprising: switching whether to enable or disable an HARQ response in accordance with a Quality of Service (QoS) class of data to be transmitted; while referring to information indicating a transition of a Frame Error Rate (FER) with respect to a communication quality for each MCS in a case in which an HARQ response is enabled and in a case in which an HARQ response is disabled, switching between an MCS in a case of the HARQ response being enabled and a corresponding MCS in a case of the HARQ response being disabled in accordance with the switching of whether to enable or disable the HARQ response.

According to a further exemplary embodiment of the present invention, there is provided a transmitting apparatus having a retransmission function of data in response to a retransmission request from a receiving apparatus in accordance with one of a plurality of classes of modulation and coding scheme which is determined based on a request from the receiving apparatus, the transmitting apparatus comprising: a storage portion which stores information indicating a transition of an error rate in communication with respect to a communication quality for each of the classes of modulation and coding scheme in a case in which the retransmission function is enabled and in a case in which the retransmission function is disabled; a function switching portion which switches whether to enable or disable the retransmission function in accordance with a type of data to be transmitted; and a scheme determining portion which determines a class of the modulation and coding scheme based on whether the retransmission function is enabled or disabled while referring to the information.

According to the above configuration, wireless communication is performed by adequate MCS in accordance with whether an HARQ is enabled or disabled, so that highly stable wireless communication can be obtained.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 4 is a view for explaining the class of an MCS;

DETAILED DESCRIPTION OF THE INVENTION

Figure 1:
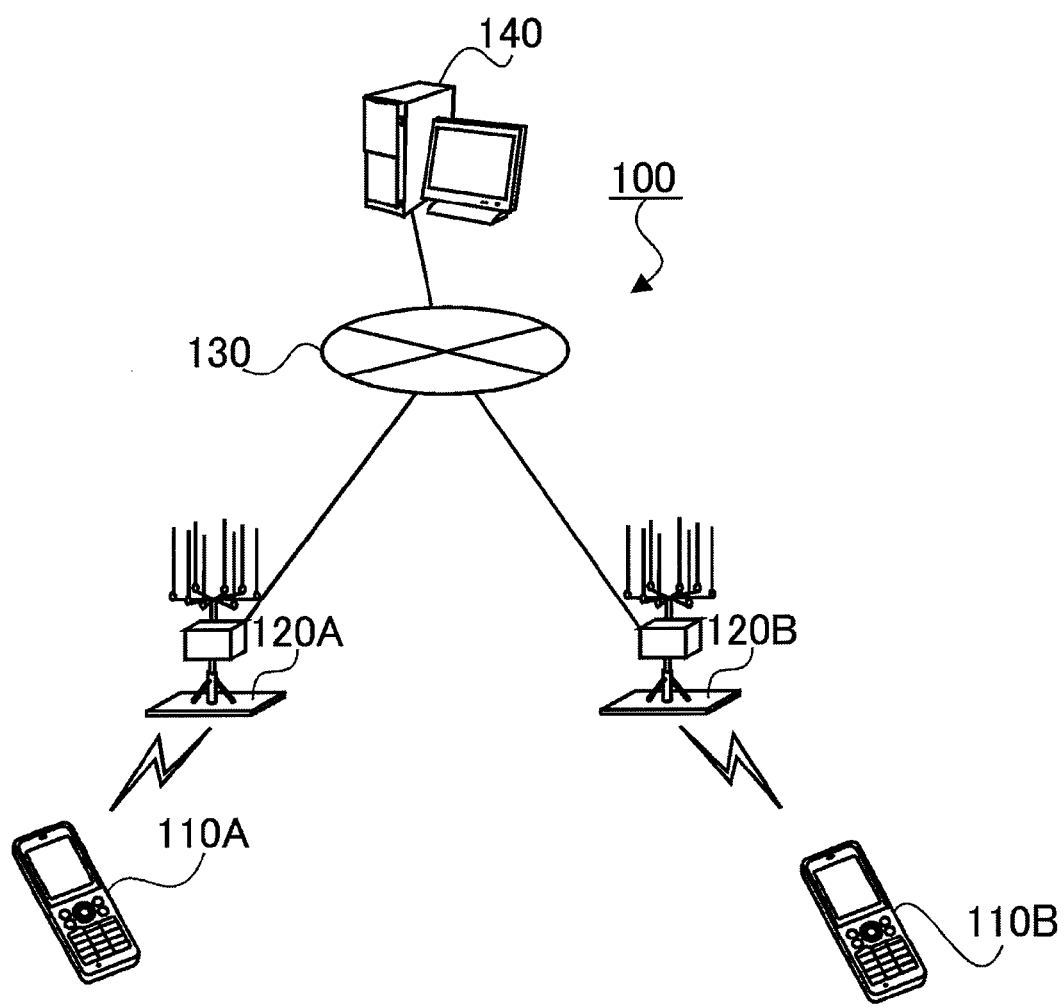
FIG. 1 is a diagram schematically showing connection relationships in a wireless communication system.

Hereinafter, embodiments of the present invention will be described in detail with reference to the accompanying drawings. The dimensions, materials, specific numerals, and the like shown in the embodiments are mere example for facilitating the understanding of the present invention, and unless otherwise specified do not restrict the present invention. In the specification and the drawings, components having a substantially identical function and configuration are denoted by the same reference numeral, and duplicated description will be omitted. Components which are not directly related to the present invention are not shown in the figures.

Mobile stations such as a PHS terminal, a portable telephone, and the like and base stations which are fixedly located at distances configure a wireless communication system which performs wireless communication. In the wireless communication system, all of the base stations and the mobile stations function as a transmitting apparatus which transmits data and a receiving apparatus which receives data. In the embodiment, in order to facilitate the understanding, the description will be made assuming that a base station is a transmitting apparatus and a mobile stations is a receiving apparatus. It is note that an opposite configuration is possible.

First, the whole wireless communication system will be described, and then the configurations of a base station and a PHS terminal functioning as a mobile station will be described. In the embodiment, a PHS terminal is used as a mobile station. However, a mobile station is not limited to a PHS terminal. Alternatively, various electronic apparatuses which can perform wireless communication may be used as a mobile station. For example, a portable telephone, a notebook personal computer, a Personal Digital Assistant (PDA), a digital camera, a music player, a vehicle navigation system, a portable television receiver, a game machine, a DVD player, and a remote controller may be used as a mobile station.

(Wireless Communication System 100)

FIG. 1 is a diagram schematically showing connection relationships in a wireless communication system 100. The wireless communication system 100 includes PHS terminals 110 (110A, 110B), base stations 120 (120A, 120B), a communication network 130 configured by an Integrated Services Digital Network (ISDN) line, the Internet, a dedicated line, or the like, and a relay server 140.

In the wireless communication system 100, when a communication line is connected from the PHS terminal 110A of a user to the other PHS terminal 110B, the PHS terminal 110A issues a wireless connection request to the base station 120A which is in the communicable range of the PHS terminal 110A. The base station 120A which receives the wireless connection request requests the relay server 140 through the communication network 130 to perform a communication connection with the communication counterpart. The relay server 140 refers to the position registration information of the PHS terminal 110B, selects, for example, the base station 120B, which is in the communicable range of the PHS terminal 110B, to ensure a communication path between the base station 120A and the base station 120B, and establishes communication between the PHS terminal 110A and the PHS terminal 110B.

In the wireless communication system 100, various techniques are employed in order to improve the speed and quality of the communication between the PHS terminal 110 and the base station 120. In this embodiment, for example, a next-generation PHS communication technique such as ARIB STD T95 or PHS MoU is employed, and wireless communication based on the Time Division Duplex (TDD)/Orthogonal Frequency Division Multiplexing Access (OFDMA), or TDD/OFDMA system, is performed between the PHS terminal 110 and the base station 120. Also adaptive modulation is employed in the wireless communication system 100, in which the PHS terminal 110 and the base station 120 mutually request a preferable MCS, so that, while maintaining the communication quality, the modulation system is adaptively changed in accordance with the change in the communication environment, and the communication speed can be improved.

Furthermore, an HARQ in which the ARQ is combined with the Forward Error Correction (FEC) is employed in the wireless communication system 100 of the embodiment, and an error is corrected through one or plural times of retransmission data. Herein, this error correction has similar meaning as reduction of the noise level in the communication signal, and when the error correction is made, the SINR (SNR) is improved and the gain is increased. Therefore, if the HARQ is employed, an MCS for a higher modulation efficiency can be selected. In this embodiment, the PHS terminal 110 functioning as a receiving apparatus requests a MCS for a higher modulation efficiency while assuming a high gain due to the HARQ, to the base station 120 functioning as a transmitting apparatus. Hereinafter, the configurations and functions of the base station 120 and the PHS terminal 110 will be specifically described.

(Base Station 120)

Figure 2:
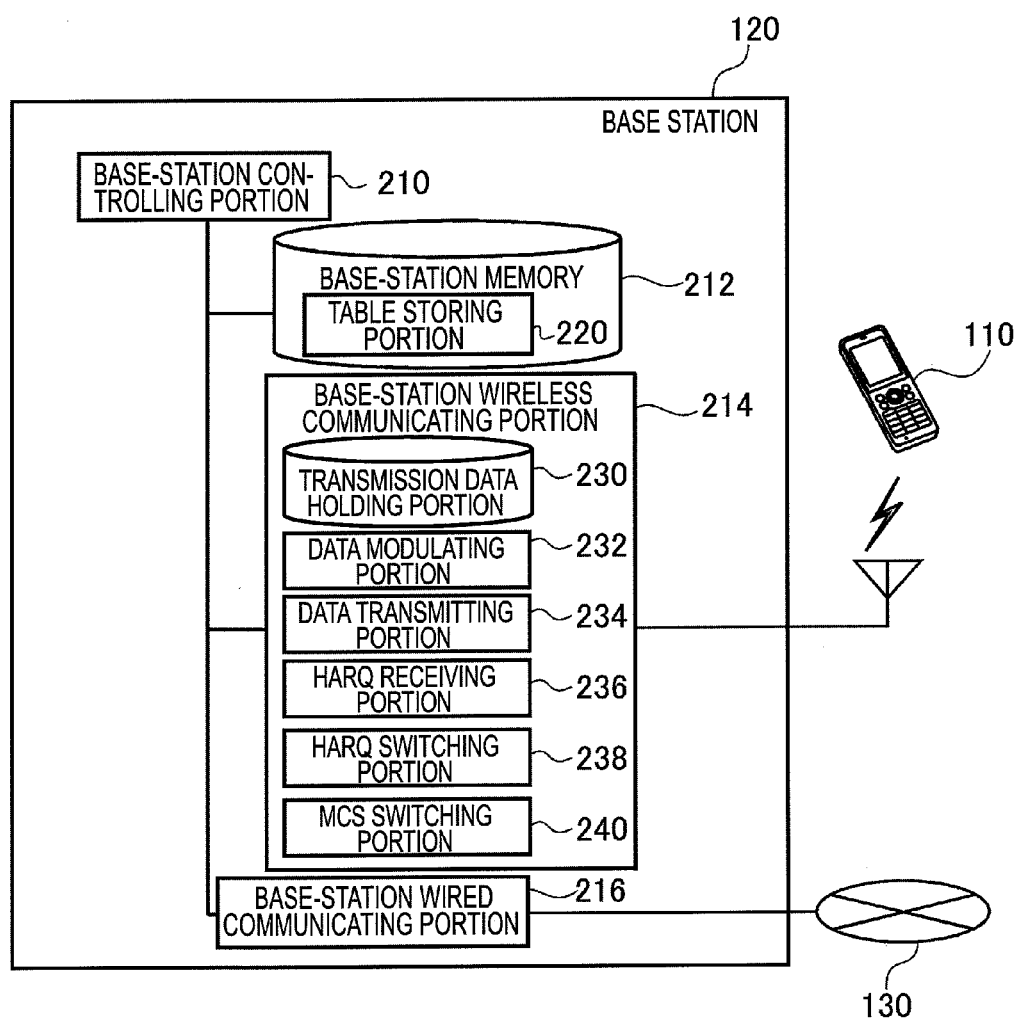
FIG. 2 is a block diagram schematically showing the configuration of a base station.

FIG. 2 is a block diagram schematically showing the configuration of the base station 120. The base station 120 includes a base-station controlling portion 210, a base-station memory 212, a base-station wireless communicating portion 214, and a base-station wired communicating portion 216.

The base-station controlling portion 210 manages and controls the whole base station 120 by a semiconductor integrated circuit including a central processing unit (CPU). Furthermore, the base-station controlling portion 210 controls communication connections of the PHS terminal 110 to the communication network 130 and the other PHS terminal 110, by using programs stored in the base-station memory 212. The base-station memory 212 is configured by a ROM, a RAM, an EEPROM, a nonvolatile RAM, a flash memory, an HDD, or the like, and stores programs and the like which are processed in the base-station controlling portion 210. The base-station memory 212 functions also as a table storing portion 220 which previously stores a table indicating a transition of Frame Error Rate (FER) with respect to a communication quality for each MCS in a case in which a HARQ response is enabled and a case in which a HARQ response is disabled. The FER is a ratio of data received with errors to total data received, and is used to determine the quality of a signal connection. The communication quality is a quality of communication considering the wireless communication environment, and is expressed by, for example, the SINR.

Figure 3:
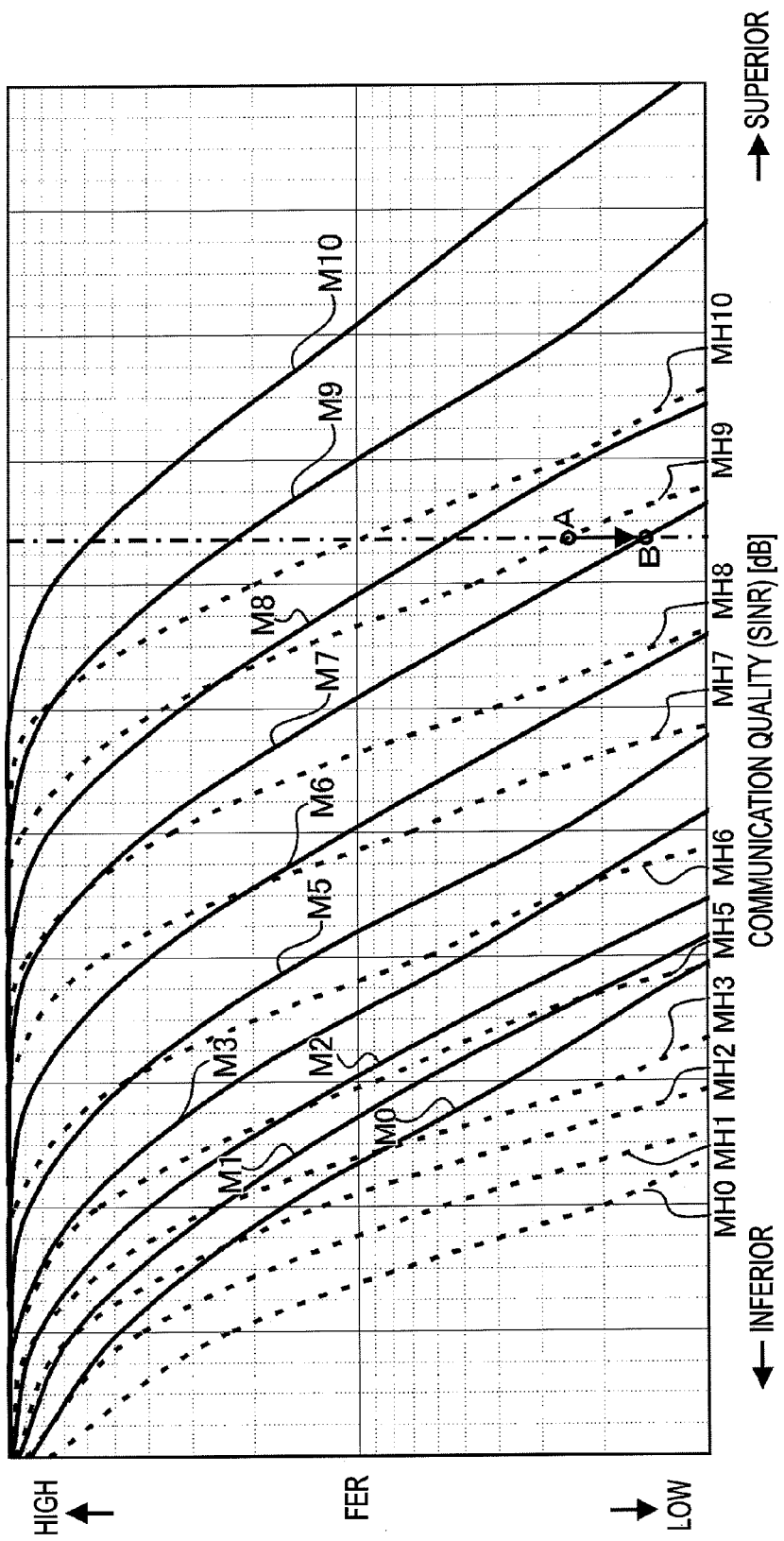
FIG. 3 is a diagram showing the concept of a table.

FIG. 3 is a diagram showing a concept of a table. In order to facilitate the understanding, the table is shown by solid lines indicating the transition of the FER to the communication quality (SINR) for each MCS. However, the actual table includes a plurality of points which constitute the transition, and interpolation is performed as required. The transitions are different depending on whether the HARQ is enabled or disabled. For the case in which the HARQ is enabled, the transition is indicated by a broken line, and the class of the MCS is indicated by the numeral following "MH". For the case in which the HARQ is disabled, the transition is indicated by a solid line, and the class of the MCS is indicated by the numeral following "M".

Referring to FIG. 3, the FER in the transition of the FER when the HARQ is enabled is lower than that in the transition of the FER when the HARQ is disabled, under the conditions of the same communication quality and the same MCS. In other words, if the HARQ is cancelled while maintaining the MCS selected while the HARQ is assumed to be effective, the FER is raised to the transition of the FER when the HARQ is disabled, and the error occurrence frequency is increased. The process using the table will be described in detail later.

FIG. 4 is a view for explaining a class of the MCS. In this embodiment, for example, 10 classes of MCSs excluding the reserved class of MCS identifier "4" are provided, and the modulation and coding scheme is prepared for each class. Referring to FIG. 4, as the numeral of the MCS identifier is larger, the modulation efficiency is higher. The numerals following "M" and "MH" in FIG. 3 correspond to the MCS identifiers in FIG. 4, respectively.

The base-station wireless communicating portion 214 establishes the communication with the PHS terminal 110, and transmits and receives data. Furthermore, the communicating portion 214 may determine the MCS which is optimum for performing efficient communication according to the quality of the communication with the PHS terminal 110, and request the PHS terminal 110 to use the determined MCS. With respect to the switching of the MCS in the adaptive modulation according to this embodiment, a FER value in the above-described table of FIG. 3 may be set as a threshold. For example, in the case of setting a predetermined percent of the FER as the threshold, when exceeding the predetermined percent, the MCS is reduced by one level to a class of a lower modulation efficiency.

The base-station wired communicating portion 216 is connected to various servers including the relay server 140 through the communication network 130.

In this embodiment, the base-station wireless communicating portion 214 functions also as a transmission data holding portion 230, a data modulating portion 232, a data transmitting portion 234, an HARQ receiving portion 236, an HARQ switching portion 238, and an MCS switching portion 240.

The transmission data holding portion 230 holds data to be transmitted (transmission data) to which cyclic redundancy check (CRC) bits are added, while the frame of the transmission data is correlated with a frame identifier which can specify the frame of the transmission data. In this embodiment, "identifier" means an indication which can uniquely specify the item by means of a numeral, alphabets, or a symbol.

The data modulating portion 232 modulates the transmission data based on the determined MCS to generate a baseband signal. The MCS is equal to or lower in modulation efficiency than that requested by the PHS terminal 110. According to this configuration, the data can be modulated based on an MCS which is equal to lower than that requested by the PHS terminal 110, and which can be modulated by the base station 120, so that more stable wireless communication can be performed with the MCS which is optimum in both of the PHS terminal 110 and the base station 120.

In the data modulating portion 232, when an HARQ is transmitted from the PHS terminal 110, an error part (retransmission data) of the data as an object of the HARQ, which is held in the transmission data holding portion 230, and which is specified by a frame identifier and an error part identifier is modulated based on the MCS requested by the PHS terminal 110. The modulation timing and the transmission timing at a later stage are defined by a standard.

The data transmitting portion 234 transmits the transmission data which are modulated in the data modulating portion 232, and the MCS identifier which can specify an MCS. When an HARQ is transmitted from the PHS terminal 110, the data transmitting portion 234 retransmits the retransmission data at a predetermined frame timing which is determined in the wireless communication system 100, in addition to the above-mentioned transmission data.

When an HARQ due to a NACK is transmitted from the PHS terminal 110, the HARQ receiving portion 236 extracts a frame identifier of data in which an error occurs, and an identifier of the error part, which are included in the anchor channel, and specifies the transmission data held in the transmission data holding portion 230, and the error part. When receiving an ACK, the HARQ receiving portion 236 releases the data held in the transmission data holding portion 230.

In accordance with the QoS class of data to be transmitted, the HARQ switching portion 238 switches whether to enable or disable the HARQ response. If transmission data are transmission data of the QoS class which does not accept delay, the HARQ switching portion 238 cancels (disables) an HARQ response, and preferentially transmits the transmission data. At this time, the HARQ switching portion 238 sets an HARQ cancel bit of the transmission data.

The term "transmission data of the QoS class which does not accept delay" refers to transmission data having a high real time property, such as voice data or motion picture data. In the QoS service class of PHS MoU (A-GN4.00-01-TS Rev. 3), such data is classified as "no Packet loss and Variable Rate Class".

In accordance with the switching whether to enable or disable the HARQ by the HARQ switching portion 238, the MCS switching portion 240 refers to the table as shown in FIG. 3, and switches between an MCS in the case of the HARQ being enabled and an MCS in the case of the HARQ being disabled corresponding thereto.

As described above, if the transmission data are transmission data of the QoS class which does not accept delay, the HARQ switching portion 238 forcibly cancels transmission of retransmission data in response to the HARQ. Therefore, a difference occurs between an adequate MCS in the case in which the HARQ is cancelled, and an MCS which is requested by the receiving apparatus assuming that the HARQ is effective. In the embodiment, despite an MCS requirement (MR) from the PHS terminal 110, the MCS switching portion 240 selects the adequate MCS in the case in which the HARQ is cancelled, whereby the modulation efficiency is lowered by the degree corresponding to the difference (the gain of the HARQ).

Referring back to FIG. 3, the above will be specifically described. For example, a case in which the MCS requested by the MR from the PHS terminal 110 is "9 (MH9)" will be explained. When the HARQ is implemented, the base station 120 can select the MCS as it is. However, such an MCS is requested assuming that the HARQ is effective. If transmission data are transmitted by the same MCS in spite that the HARQ response is cancelled, the gain is lowered and an error might occur. Therefore, the MCS switching portion 240 reduces the modulation efficiency and sets the MCS as "7 (M7)".

At this time, with respect to a communication quality derived from "9 (MH9)" and the FER in the above example, the MCS switching portion 240 switches the MCS so that the FER in the case of the HARQ being disabled is equal to or lower than the FER in the case of the HARQ being enabled.

In the MCS switching portion 240, with respect to the communication quality derived from the MCS and FER before switching indicated by the dash-dot line in FIG. 3, i.e., the communication environment at this timing, the FER after switching is preferably equal to the FER before switching. However, the transitions of the FER in the cases in which the HARQ response is enabled and disabled are different from each other in the table. Therefore, in the case in which the FERs are different from each other with respect to the same communication quality, the FER (B in FIG. 3) after switching is set to be equal to or lower than the FER (A in FIG. 3) before switching, in order to perform wireless communication in the stable side. According to the configuration, irrespective of the QoS class of the transmission data, it is possible to obtain highly stable wireless communication.

The MCS switching portion 240 transmits the changed MCS "7 (M7)" to the data modulating portion 232 to cause the data modulating portion to perform modulation by the changed MCS, and writes the changed MCS into an MI (MCS Indicator) for the PHS terminal 110.

(PHS Terminal 110)

Figure 5:
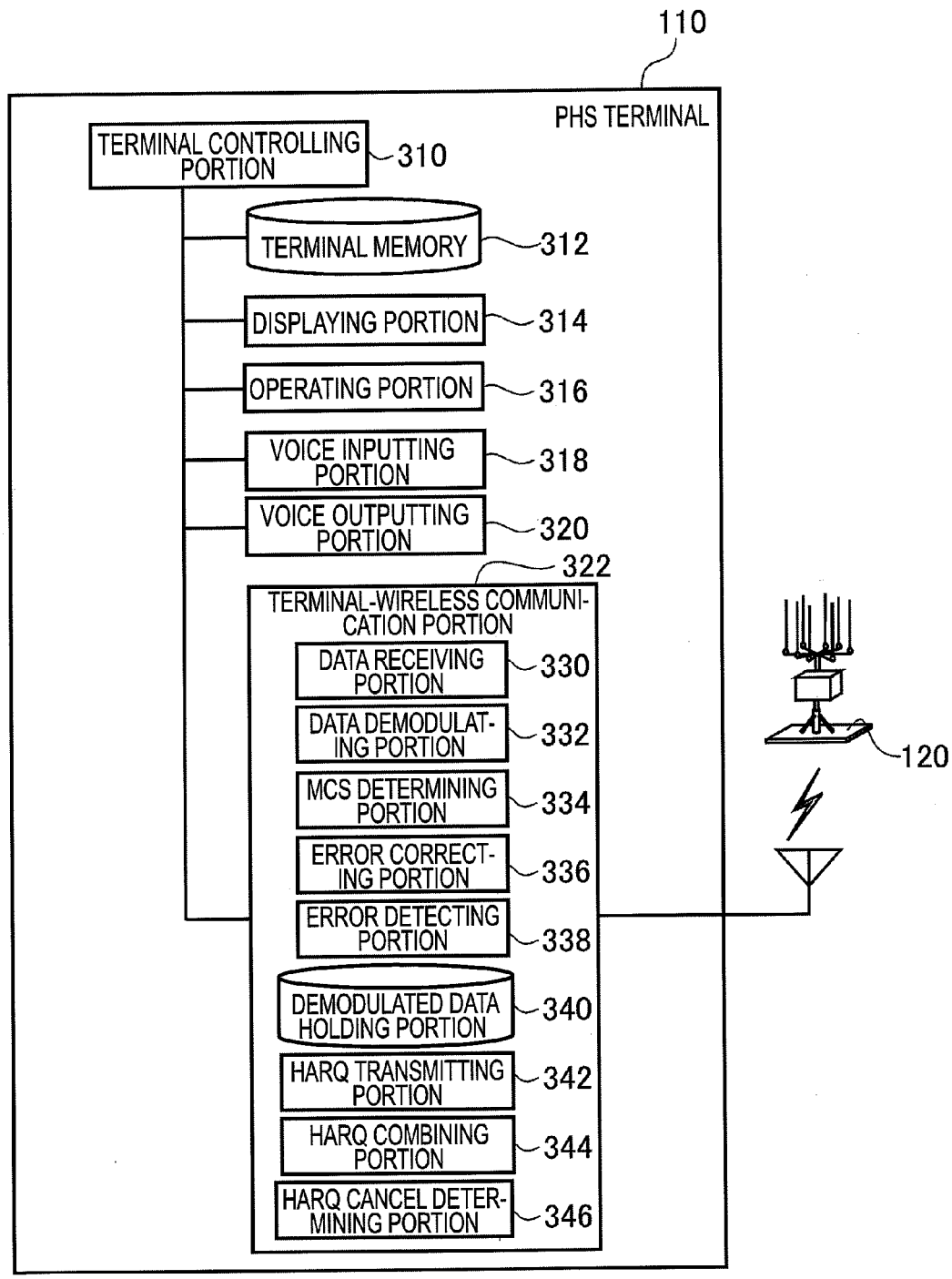
FIG. 5 is a functional block diagram showing the hardware configuration of a PHS terminal.
Figure 6:
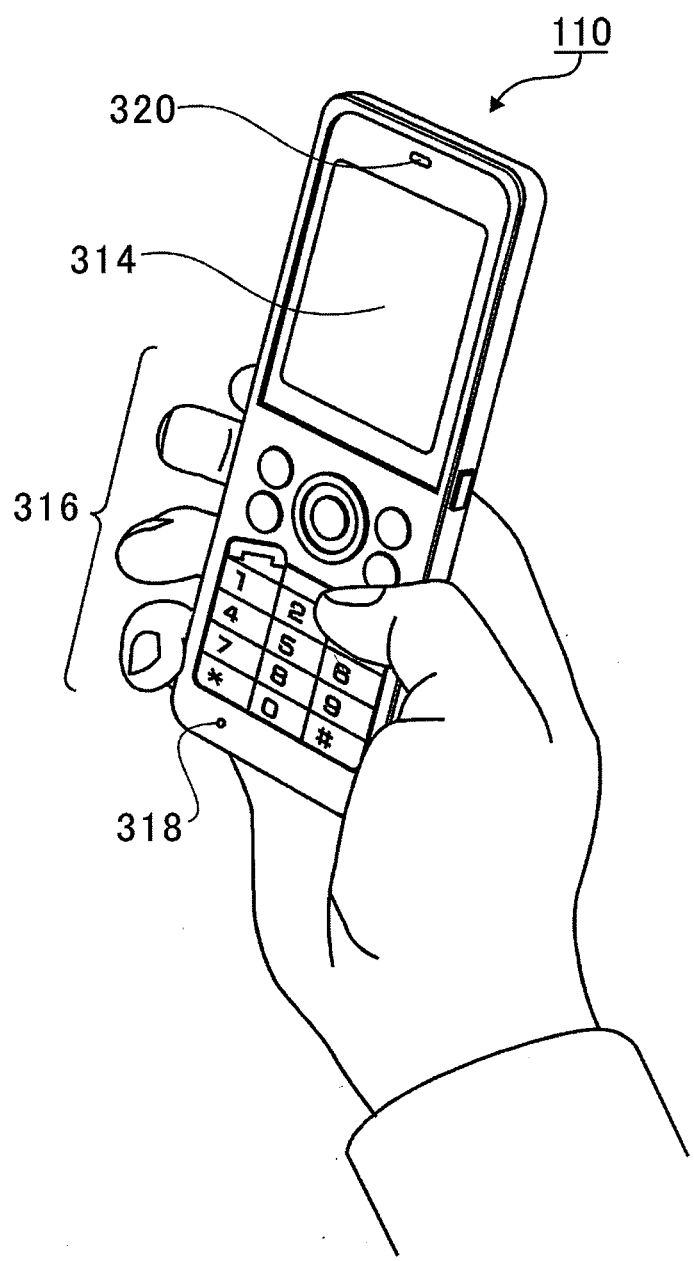
FIG. 6 is a perspective view showing the appearance of the PHS terminal.

FIG. 5 is a functional block diagram showing the hardware configuration of the PHS terminal 110, and FIG. 6 is a perspective view showing the appearance of the PHS terminal 110. The PHS terminal 110 includes a terminal controlling portion 310, a terminal memory 312, a displaying portion 314, an operating portion 316, a voice inputting portion 318, a voice outputting portion 320, and a terminal-wireless communication portion 322.

The terminal controlling portion 310 manages and controls the whole PHS terminal 110 by means of a semiconductor integrated circuit including a central processing unit (CPU). Furthermore, the terminal controlling portion 310 executes also a telephone call function, a mail transmitting and receiving function, an imaging function, a music reproducing function, and a TV viewing function, by using programs stored in the terminal memory 312. The terminal memory 312 is configured by a ROM, a RAM, an EEPROM, a nonvolatile RAM, a flash memory, an HDD, or the like, and stores programs, voice data, and the like which are to be processed in the terminal controlling portion 310.

The displaying portion 314 is configured by a liquid crystal display device, an Electro Luminescence (EL) device, or the like, and can display a Graphical User Interface (GUI) of a Web browser or an application program which is stored in the terminal memory 312 or provided by an application relay server (not shown) through the communication network 130. The operating portion 316 is configured by switches such as a keyboard, a cross key, and a joy stick, and receives an operation input from the user.

The voice inputting portion 318 is configured by voice recognizing means such as a microphone, and converts the voice of the user which is input in a telephone call, to an electric signal which can be processed in the PHS terminal 110. The voice outputting portion 320 is configured by a speaker, converts a voice signal of the call partner received by the PHS terminal 110 to sound, and outputs the sound. The voice outputting portion can output also a ring tone, an operation tone of the operating portion 316, a warning tone, and the like.

In the embodiment, the terminal-wireless communication portion 322 functions also as a data receiving portion 330, a data demodulating portion 332, an MCS determining portion 334, an error correcting portion 336, an error detecting portion 338, a demodulated data holding portion 340, an HARQ transmitting portion 342, an HARQ combining portion 344, and an HARQ cancel determining portion 346.

The data receiving portion 330 receives data and the MCS identifier from the base station 120.

The data demodulating portion 332 demodulates the data on the basis of the MCS which is specified by the MCS identifier (MI) received by the data receiving portion 330, and transfers the demodulated data to the error correcting portion 336. If, after the PHS terminal 110 requests an HARQ, data including retransmission data are received at a predetermined timing, the data demodulating portion 332 demodulates the received data on the basis of the MCS which is specified by the received MCS identifier, and transfers the demodulated data to the HARQ combining portion 344.

The MCS determining portion 334 calculates the SINR of the data which are demodulated by the data demodulating portion 332, and determines the MCS which is to be requested to the base station 120.

The error correcting (FEC) portion 336 performs error correction of the data transferred from the data demodulating portion 332 or the HARQ combining portion 344, on the basis of an error correcting method such as Viterbi coding.

The error detecting portion 338 detects an error which cannot be corrected by the error correcting portion 336, by a cyclic redundancy check bit (CRC) or the like. If an error is not detected in the received data, the error detecting portion 338 informs a MAC layer of information of a PHY payload, instructs the HARQ transmitting portion 342 which will be described later, to return an ACK, and clears data in the demodulated data holding portion 340 which will be described later. If an error is detected, the error detecting portion does not pass information of a PHY payload to the MAC layer, and causes the HARQ transmitting portion 342 to return a NACK.

If the error detecting portion 338 detects an error, the demodulated data holding portion 340 holds the demodulated data and the MCS identifier of the data while being correlated with a frame identifier.

Further, if the error detecting portion 338 detects an error, the HARQ transmitting portion 342 transmits an HARQ including the frame identifier of the data and the identifier of the error part, to the base station 120. In the embodiment, data in the unit of frame are alternately transmitted and received with respect to the base station 120 by the TDD/OFDM system, and hence the HARQ is transmitted by using the anchor channel of the transmitted data which are to be transmitted to the base station 120. At this time, the MCS requirement (MR) which is set in the anchor channel is the MCS for the data in which the error is detected.

The HARQ combining portion 344 performs Chase combining of the retransmission data which are demodulated by the data demodulating portion 332, and the data which are held in the demodulated data holding portion 340, by using a combining method such as the Chase combining method or the Incremental Redundancy (IR) combining method, and transfers the combined data to the error correcting portion 336.

Figure 7:
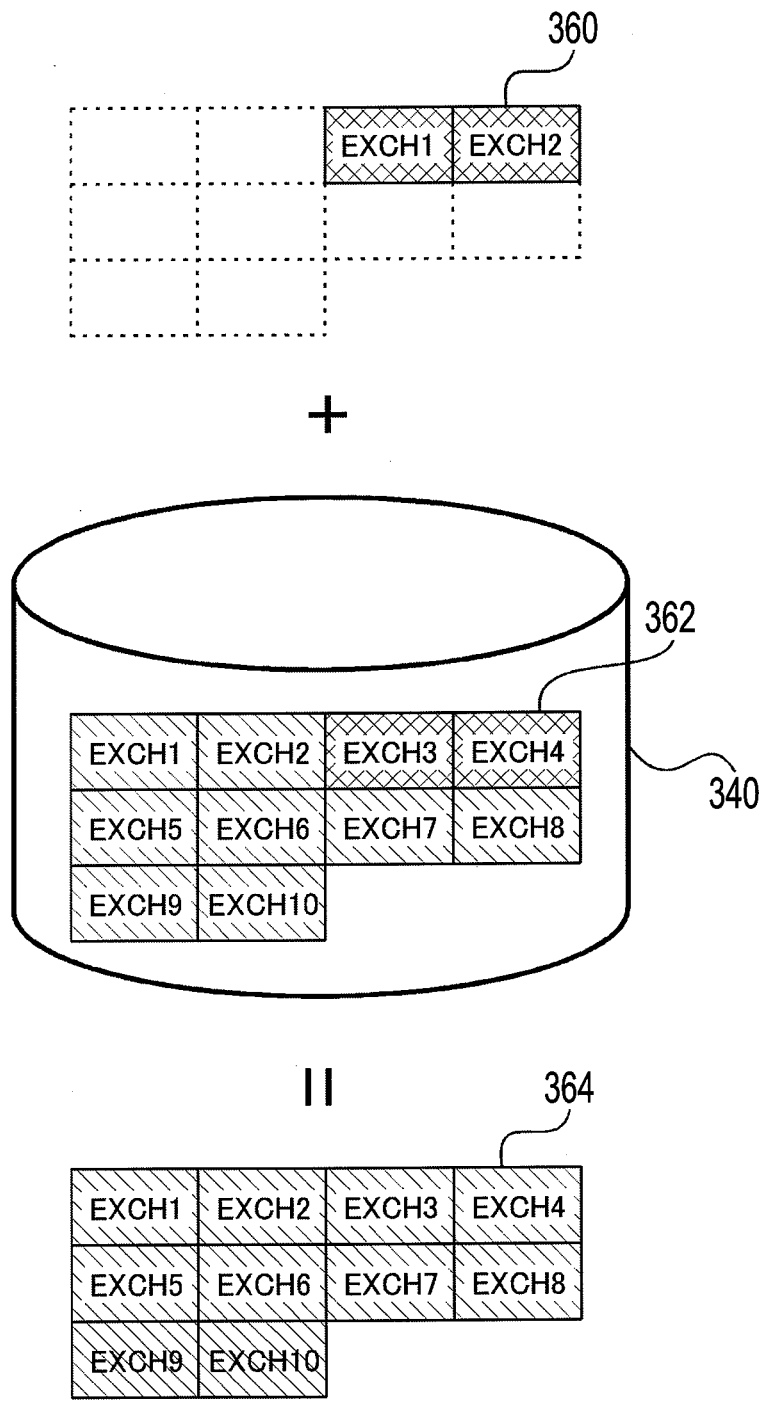
FIG. 7 is a diagram illustrating the operation of the Chase combining method.

FIG. 7 is a diagram illustrating the operation of the Chase combining method. In FIG. 7, "EXCH" indicates an extra channel, and means a Physical Resource Unit (PRU) which is allocated to each user as a call path in the FM-Mode.

If an error is detected in the data which are received and demodulated by the PHS terminal 110, only the error part is transmitted together with the NACK to the base station 120, and holds the frame in which the error is detected, in the demodulated data holding portion 340 without discarding the frame. When receiving only the error part as retransmission data 360 from the base station 120, the PHS terminal 110 combines the retransmission data 360 with the data 362 held in the demodulated data holding portion 340, by the maximum ratio combining (MRC) to produce reconstructed data 364. In the Chase combining method, the SINR of a receiving frame is improved by the maximum ratio combining of data, and errors can be efficiently reduced.

The HARQ cancel determining portion 346 determines whether the HARQ cancel bit is set in the data demodulated by the data demodulating portion 332 or not. If the HARQ cancel determining portion 346 determines that the HARQ cancel bit is set, the combing process by the HARQ combining portion 344 is not performed. Then, the error detecting portion 338 performs the error detection on the data after error correction. If an error is not detected, the portion transmits the data to the higher MAC layer. Since the HARQ is cancelled, even if an error is detected, the portion returns the ACK to the ACK field, and entrusts the higher layer (ARQ) to perform the retransmission request.

In the above-described wireless communication system 100, by using the communication path between two apparatuses, or in the embodiment the PHS terminal 110 and the base station 120, the both apparatuses can perform the error correction due to the HARQ. Further, even when the HARQ is cancelled, an adequate MCS in accordance with whether an HARQ is enabled or disabled is selected, whereby highly stable wireless communication can be obtained. Next, a wireless communication method which performs wireless communication by using the above-described PHS terminal 110 and base station 120 will be described.

(Wireless Communication Method)

Figure 8:
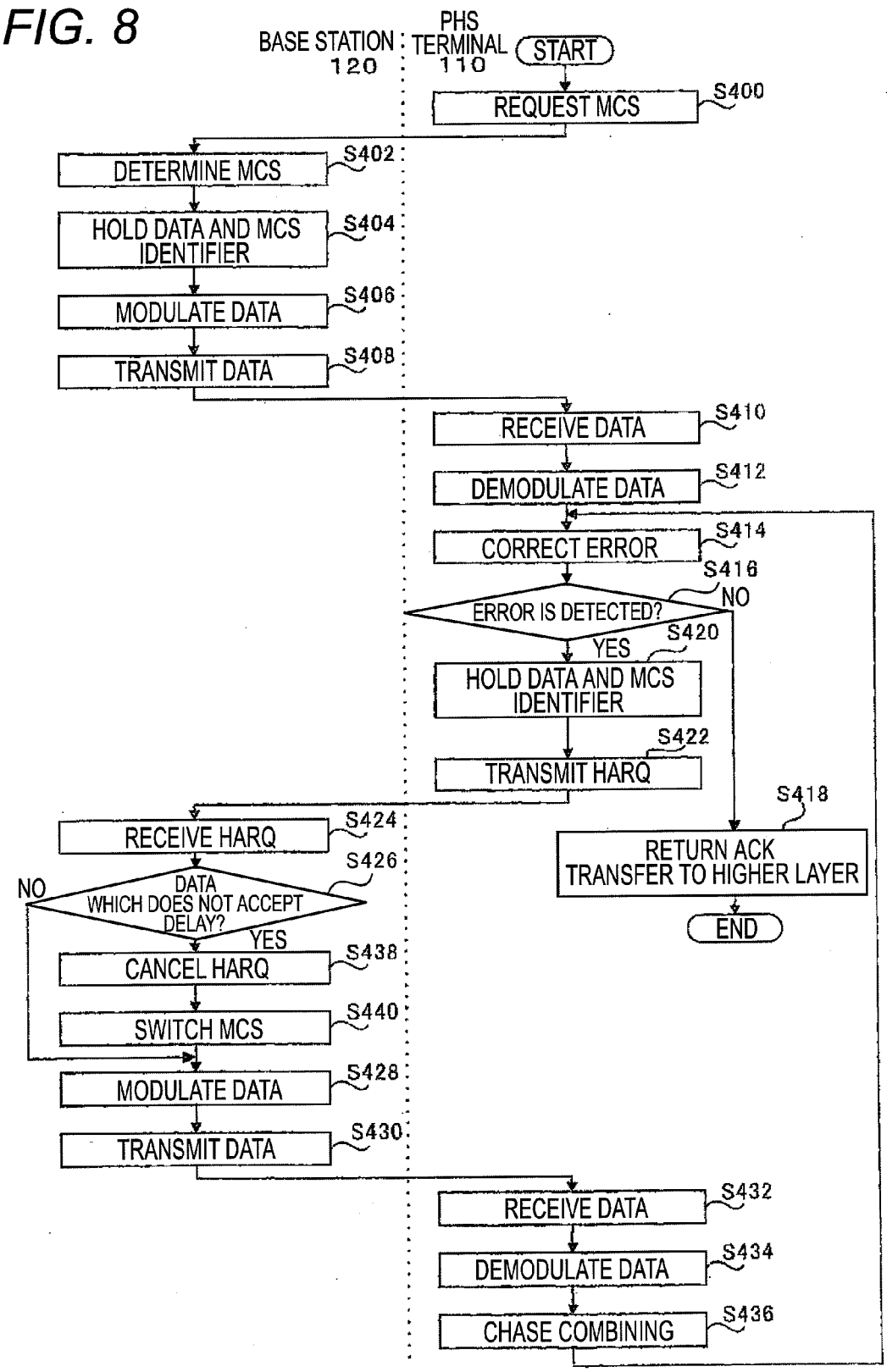
FIG. 8 is a flowchart showing the process flow of a wireless communication method.
Figure 9:
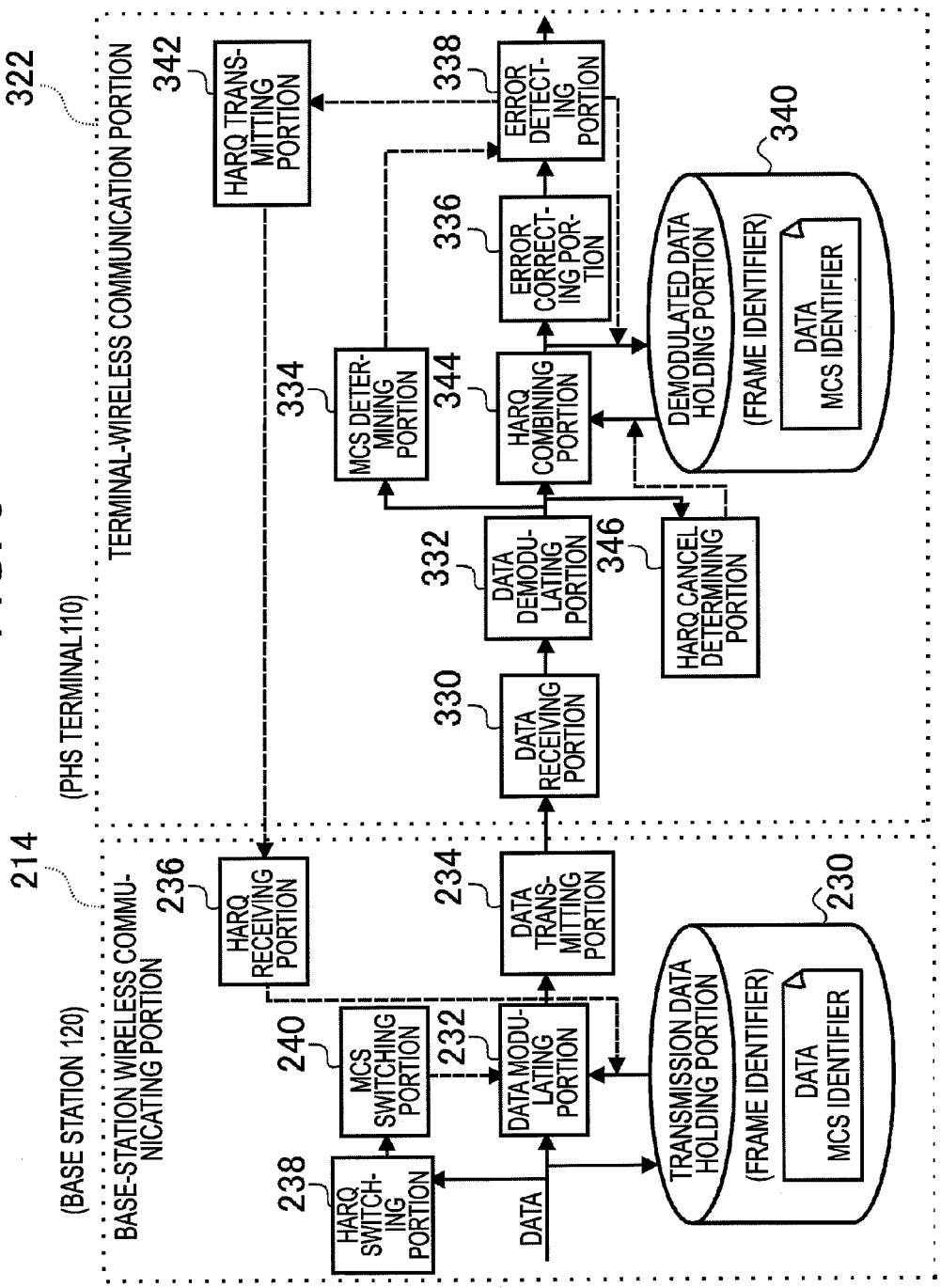
FIG. 9 is a block diagram for explaining the flowchart of FIG. 8.

FIG. 8 is a flowchart showing the process flow of the wireless communication method, and FIG. 9 is a block diagram supplementary illustrating the flowchart of FIG. 8.

First, the PHS terminal 110 requests an MCS through the anchor channel of the transmitted data (S400), and the base station 120 determines the MCS of data to be transmitted in accordance with the requested MCS (S402). Then, the base station 120 once holds the data to be transmitted in the transmission data holding portion 230 (S404). The data held in the transmission data holding portion 230 is continued to be held until elapse of a predetermined time period during which it can be assumed that an HARQ has not been produced. The data modulating portion 232 of the base station 120 modulates the data by using the MCS (S406), and the data transmitting portion 234 transmits the modulated data to the PHS terminal 110 (S408).

When the data receiving portion 330 of the PHS terminal 110 receives the data and the MCS identifier from the base station 120 (S410), the data demodulating portion 332 demodulates the data on the basis of the MCS which is specified by the MCS identifier (S412), and the error correcting portion 336 performs error correction of the data (S414). The error detecting portion 338 detects whether an error which cannot be corrected by the error correcting portion 336 remains (S416). If there is no error, an ACK is returned to the base station 120, and the data are transferred to the higher layer (S418).

If an error is detected in the error detecting step (S416), the demodulated data holding portion 340 holds the demodulated data and the MCS identifier of the data while being correlated with a frame identifier (S420), and the HARQ transmitting portion 342 transmits an HARQ by using an ACK field including the NACK, the frame identifier, and the identifier of the error part (S422).

When receiving the HARQ, the HARQ receiving portion 236 of the base station 120 prepares the error part which can be specified by the frame identifier and the error part identifier of the ACK field, and which is in the data held in the transmission data holding portion 230, as retransmission data (S424).

It is determined whether the next transmission data are data of the QoS class which does not accept delay (S426). In the case of usual transmission data which accepts delay, the data modulating portion 232 modulates the transmission data and the retransmission data on the basis of the MCS requested by the PHS terminal 110 (S428).

The data transmitting portion 234 of the base station 120 transmits the modulated data to the PHS terminal 110 (S430). When the transmission data holding portion 230 of the PHS terminal 110 receives the data (S432), the data demodulating portion 332 demodulates the received retransmission data at a defined HARQ timing and on the basis of the MCS held in the demodulated data holding portion 340, and further demodulates the usual data on the basis of the MCS which is determined by adaptive modulation (S434). Thereafter, the HARQ combining portion 344 performs Chase combining of the demodulated error part and the data which are held in the demodulated data holding portion 340 (S436), and the processes subsequent to the data error correcting step (S414) are repeated.

If it is determined in the transmission data determining step (S426) that the transmission data are data of the QoS class which does not accept delay ("YES" of S426), the HARQ switching portion 238 of the base station 120 cancels (disables) the HARQ response (S438), and the MCS switching portion 240 refers to the table stored in the table storing portion 220, and switches the MCS in the case of the HARQ being enabled to the MCS in the case of the HARQ being disabled corresponding thereto (S440).

Also in the wireless communication method, because of an adequate MCS in accordance with whether an HARQ is enabled or disabled, highly stable wireless communication can be obtained.

Although the preferred embodiment of the invention has been described with reference to the accompanying drawings, it is a matter of course that the invention is not restricted to the example. It is obvious to those skilled in the art that various changes and modifications can be made within the scope of the appended claims, and it is to be understood that they naturally belong to the technical scope of the invention.

The steps of the wireless communication method in the specification are not always required to be executed in a time sequential manner in the order which has been described in the form of the flowchart, and may include parallel processes or subroutine processes.

The present invention can be applied to a transmitting apparatus and wireless communication method which can perform wireless communication by adaptive modulation (high-speed adaptive modulation).

What is claimed is:

1. A transmitting apparatus capable of transmitting, together with transmission data, retransmission data in response to a Hybrid Automatic Repeat Request (HARQ) from a receiving apparatus, according to a Modulation and Coding Scheme (MCS) determined based on a request from the receiving apparatus, the transmitting apparatus comprising:
   a storage portion which stores information indicating a transition of a Frame Error Rate (FER) with respect to a communication quality for each MCS in a case in which an HARQ response is enabled and in a case in which an HARQ response is disabled;
   an HARQ switching portion which switches whether to enable or disable the HARQ response in accordance with a Quality of Service (QoS) class of data to be transmitted; and
   an MCS switching portion which switches between an MCS in a case of the HARQ response being enabled and a corresponding MCS in a case of the HARQ response being disabled in accordance with the switching of whether to enable or disable the HARQ response, while referring to the information stored in the storage portion,
   wherein, when the MCS in the case of the HARQ being enabled is switched into the MCS in the case of the HARQ being disabled, the MCS switching portion switches the MCS so that, with respect to a communication quality derived from the MCS and the FER before switching, the FER after switching becomes equal to or lower than the FER before switching.

2. The transmitting apparatus according to claim 1, wherein the transmitting apparatus performs wireless communication conforming to ARIB STD T95 or PHS MoU.

3. The transmission apparatus according to claim 1, wherein the storage portion stores the information in a table.

4. The transmission apparatus according to claim 1, further comprising a transmitting portion which, when the HARQ response is disabled in accordance with the QoS class of data to be transmitted, transmits, to the receiving apparatus, information indicating that an HARQ response is disabled and information indicating the MCS switched by the MCS switching portion.

5. The transmission apparatus according to claim 1, wherein when the MCS in the case of the HARQ being enabled is switched into the MCS in the case of the HARQ disabled, the MCS switching portion switches the MCS so that modulation efficiency becomes lower.

6. A wireless communication method for transmitting, together with transmission data, retransmission data in response to a Hybrid Automatic Repeat Request (HARQ) from a receiving apparatus, according to a Modulation and Coding Scheme (MCS) determined based on a request from the receiving apparatus, the method comprising:
   switching whether to enable or disable an HARQ response in accordance with a Quality of Service (QoS) class of data to be transmitted;
   while referring to information indicating a transition of a Frame Error Rate (FER) with respect to a communication quality for each MCS in a case in which an HARQ response is enabled and in a case in which an HARQ response is disabled, switching between an MCS in a case of the HARQ response being enabled and a corresponding MCS in a case of the HARQ response being disabled in accordance with the switching of whether to enable or disable the HARQ response,
   wherein, when the MCS in the case of the HARQ being enabled is switched into the MCS in the case of the HARQ being disabled, the MCS switching portion switches the MCS so that, with respect to a communication quality derived from the MCS and the FER before switching, the FER after switching becomes equal to or lower than the FER before switching.

7. A transmitting apparatus having a retransmission function of data in response to a retransmission request from a receiving apparatus in accordance with one of a plurality of classes of modulation and coding scheme which is determined based on a request from the receiving apparatus, the transmitting apparatus comprising:
   a storage portion which stores information indicating a transition of an error rate in communication with respect to a communication quality for each of the classes of modulation and coding scheme in a case in which the retransmission function is enabled and in a case in which the retransmission function is disabled;
   a function switching portion which switches whether to enable or disable the retransmission function in accordance with a type of data to be transmitted; and
   a scheme determining portion which determines a class of the modulation and coding scheme based on whether the retransmission function is enabled or disabled while referring to the information,
   wherein, when a class of modulation and coding scheme in the case in which the retransmission function is enabled is switched into a class of modulation and coding scheme in the case in which the retransmission function is disabled, the function switching portion switches the class of modulation and coding scheme so that, with respect to a communication quality derived from the class of modulation and coding scheme and the error rate before switching, the error rate after switching becomes equal to or lower than the error rate before switching.

\* \* \* \* \*